United States Patent [19]

Nofzinger

[11] Patent Number: 4,967,136
[45] Date of Patent: Oct. 30, 1990

[54] BATTERY EQUALIZATION CIRCUIT FOR A DUAL VOLTAGE CHARGING SYSTEM

[75] Inventor: Scott L. Nofzinger, Toledo, Ohio

[73] Assignee: Prestolite Electric Incorporated, Toledo, Ohio

[21] Appl. No.: 412,199

[22] Filed: Sep. 25, 1989

[51] Int. Cl.⁵ .............................................. H02J 7/14
[52] U.S. Cl. ........................................ 320/6; 320/17; 322/90
[58] Field of Search .................. 320/6, 15, 17; 322/90

[56] References Cited

U.S. PATENT DOCUMENTS 4,047,088  9/1977  Himmler .................................. 320/6
4,479,083  10/1984  Sullivan ............................ 320/17 X Primary Examiner—R. J. Hickey
Attorney, Agent, or Firm—McAndrews, Held & Malloy, Ltd.

[57] ABSTRACT

A battery equalization circuit maintains first and second series connected batteries at equal voltages. The circuit includes a capacitor coupled across the first battery by a pair of switches for sampling the voltage across the first battery. An error amplifier compares the first battery's sampled voltage to the second battery's voltage to produce an error signal indicative of the difference between the voltage across the first battery and the voltage across the second battery. A charging and regulating circuit is responsive to the error signal for charging the batteries to reduce the error signal to zero.

15 Claims, 1 Drawing Sheet

BATTERY EQUALIZATION CIRCUIT FOR A DUAL VOLTAGE CHARGING SYSTEM

FIELD OF THE INVENTION

The present invention relates to a dual voltage charging system and more particularly to a battery equalization circuit for such a system.

DESCRIPTION OF THE BACKGROUND

Dual voltage charging systems are known for maintaining two series connected batteries at equal voltages for supplying power to a pair of variable loads. Such dual voltage charging systems have included a battery equalization circuit with two independent sensing networks each requiring an individual reference voltage. This type of equalization circuit does not provide automatic tracking of the battery voltages. Further, because of the duplicate sensing networks and the need for dual calibration, this type of circuit is costly and inefficient. This type of circuit is also susceptible to temperature drift.

Other battery equalization circuits for dual voltage charging systems have included a voltage divider circuit coupled to the batteries. The voltage divider circuit provides a reference voltage that is equal to half the total voltage across the batteries. A regulated D.C. to D.C. converter has its output connected across one of the batteries for charging that battery to a level indicated by the reference voltage. The voltage divider of this battery equalization circuit must either be calibrated or include expensive precision resistors in order to set a precise reference voltage for maintaining a balance between the voltages provided by the batteries. Further, the resistors in the voltage divider must have matched temperature coefficients to maintain the balance between the battery voltages over a range of temperatures.

SUMMARY OF THE INVENTION

In accordance with the present invention, the disadvantages of prior battery equalization circuits as discussed above have been overcome. The battery equalization circuit of the present invention samples the voltages across each of two series connected batteries to provide a representation thereof; and compares the representations to provide an error signal that is used to regulate the charge on at least one of the batteries to balance the voltage provided by the batteries.

More particularly, the battery equalization circuit of the present invention includes a capacitor coupled through a first switching means across the battery that is not referenced to ground to sample the voltage across the battery and provide a representation thereof when the first switching means is closed. The capacitor is also coupled to an error amplifier through a second switching means to compare the representation of the voltage across the battery not referenced to ground, as stored by the capacitor, to the voltage across the other battery that is referenced to ground. The error amplifier produces an error signal indicative of the difference between the voltages across the batteries, the error signal being applied to a charging and regulation circuit that is responsive to the error signal to minimize the difference between the voltages provided by the batteries.

The battery equalization circuit further includes a hold network coupled between the second switching means and the error amplifier to stabilize the charging current.

The battery equalization circuit of the present invention compensates for battery imbalance independent of the method employed to charge the batteries and the value to which the batteries are charged. Further, the effects of temperature drift are minimized and calibration is unnecessary since the circuit is not dependant on absolute component values.

BRIEF DESCRIPTION OF THE DRAWINGS

Other features and advantages of the invention will be apparent from the following description taken in connection with the accompanying drawing wherein.

DETAILED DESCRIPTION OF THE PREFERRED EMBODIMENT

Figure 1:
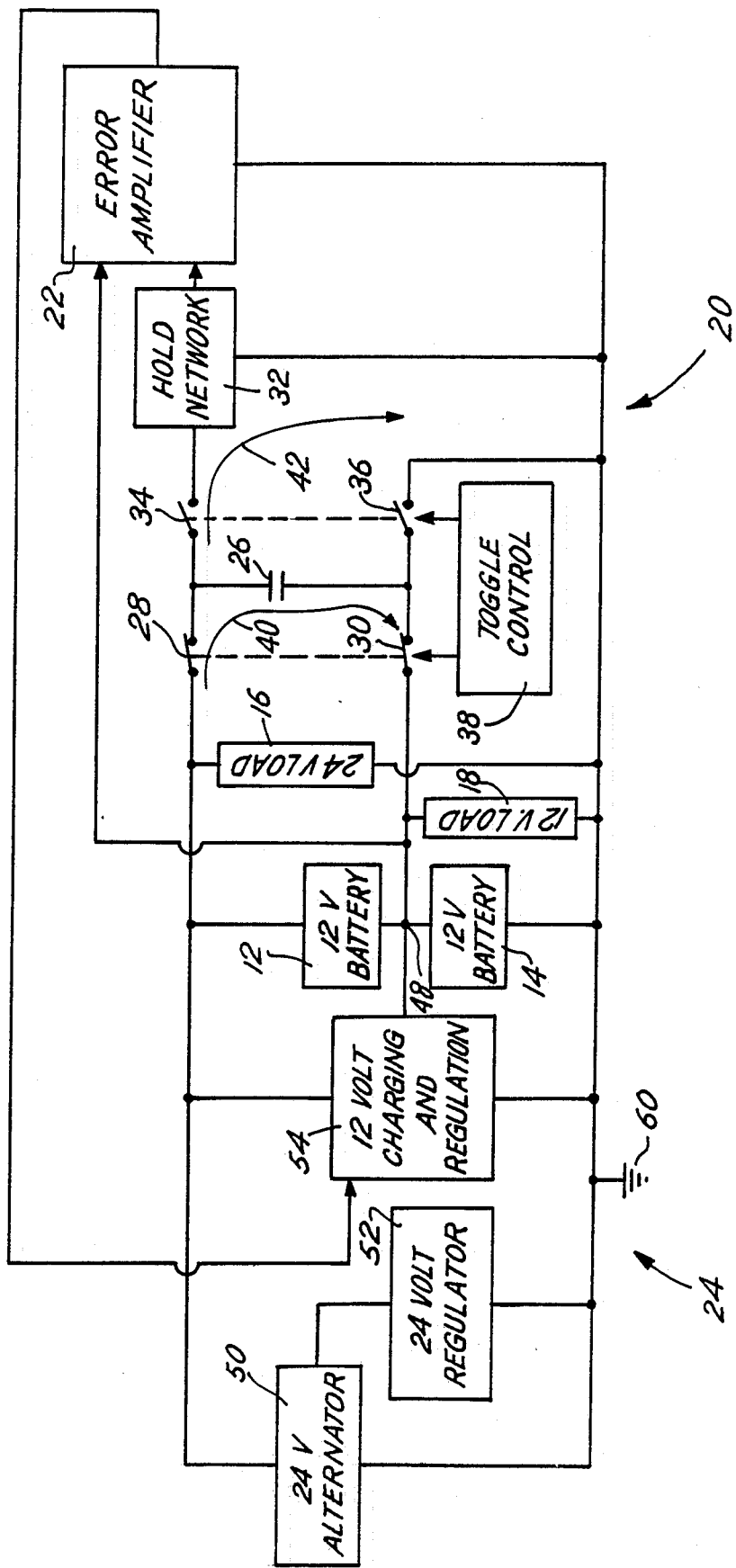
FIG. 1 is a block diagram of the battery equalization circuit of the present invention.

The battery equalization circuit of the present invention for a dual voltage charging system is illustrated in FIG. 1. The dual voltage charging system includes a pair of +12 volt batteries 12 and 14 connected in series across a 24 volt load 16. The +12 volt battery 14 is additionally connected across a 12 volt load 18. Because different loads are coupled across the batteries 12 and 14, the batteries can discharge at unequal rates. The battery equalization circuit of the present invention insures a balance is maintained between the voltages across the batteries 12 and 14.

The battery equalization circuit includes a sampling circuit 20 for sampling the voltage across the battery 12 to provide a signal representative thereof to an error amplifier. Although the voltage across the battery 14 may be similarly sampled as discussed below, because this voltage is referenced with respect to ground, it may be applied as a direct input to the error amplifier 22. The error amplifier 22 compares the signal representing the sampled voltage across the battery 12 to the signal representing the voltage across the battery 14 to producing an error signal indicative of the difference between the voltages across the batteries 12 and 14. A charging-/regulating for circuit 24 is responsive to the error signal output from the error amplifier 22 to minimize the difference between the voltages across the first and second batteries 12 and 14.

The sampling circuit 20 includes a capacitor 26 coupled across the battery 12 through a first pair of ganged switches 28 and 30. Similarly, the capacitor 26 is coupled to a hold network 32 through a second pair of ganged switches 34 and 36. The first pair of switches 28 and 30 and the second pair of switches 34 and 36 are alternately opened and closed by a toggle control 38 to charge and discharge the capacitor 26. More particularly, the toggle control 38 includes a free-running oscillator providing an output having a fifty percent duty cycle that opens and closes the switches 28, 30, 34 and 36 for equal amounts of time, the switches 28 and 30 being closed when the switches 34 and 36 are opened and visa versa.

The operation of the sampling circuit 20 of the present invention involves closing the first pair of switches 28, 30 while the switches 34, 36 are open to periodically sample the voltage across the battery 12. The voltage sampled is stored in the form of charge on the capacitor 26 until coupled to a hold network 32 by the simultaneous opening and closing of respective switch pairs 28, 30 and 34, 36. More particularly, when the first pair of switches 28 and 30 is closed in response to the output of the toggle control 38, current is conducted along a path 40 to charge the capacitor 26 to a voltage representative of the voltage across the battery 12. Following the charging of the capacitor 26, the toggle control 38 opens the first pair of switches 28 and 30 and simultaneously closes the second pair of switches 34 and 36 to provide a current path 42 for discharging the capacitor to ground via the hold network 32 which temporarily stores the voltage representative of the voltage across the battery 12. The hold network 32 may be formed of a capacitor or other conventional sample and hold circuits may be used. Due to the periodic switching of the circuitry mentioned above, the hold network 32 is needed to produce a stable charging current for the battery 14 if the voltages across the respective batteries 12 and 14 are not equal.

The error amplifier 22 which may be formed of a differential amplifier is coupled to the hold network 32 as well as to the battery 14 for comparing the sampled voltage across the battery 12 to the voltage (or a representation thereof) across the battery 14. In response to the comparison, the error amplifier 22 produces an error signal representing the difference between the voltages across the batteries 12 and 14. The error signal output from the error amplifier 22 is coupled to the charging/regulating circuit 24 for minimizing the difference between the voltages across the batteries 12 and 14.

The charging/regulating circuit 24 includes a conventional 24 volt alternator 50 coupled to a 24 volt regulator 52 for providing +24 volts which is coupled across the series combination of the batteries 12 and 14 for independently charging the battery 12. The charging and regulation circuit 54 is responsive to a nonzero error signal for charging the battery 14 until the error signal is reduced to zero.

The battery equalization circuit of the present invention compensates for battery imbalance independent of the method employed to charge the batteries and the value to which the batteries are charged. Further, the effects of temperature drift are minimized since the circuit is not dependent on absolute component values.

Although the battery equalization circuit described consists of two batteries, any number of batteries could be equally charged using this scheme. Likewise, even though demonstrated in FIG. 1 as having an alternator as a power source, it is equally effective using alternative power sources.

Many modifications and variations of the present invention are possible in light of the above teachings. Thus, it is to be understood that, within the scope of the appended claims, the invention may be practiced otherwise than as described above.

What is claimed and desired to be secured by Letters Patent is:

1. In a system having first and second batteries connected in series across a first load, a second load being connected across said second battery, a battery equalization system for maintaining a balance between the voltages provided by said first and second batteries comprising:
    means coupled to said first battery for storing charge;
    first switching means having an open position and a closed position for charging said storage means to a first value representative of said voltage provided by said first battery when said first switch means is in said closed position;
    means coupled to said storage means and to said second battery for comparing said first value to a second value representative of the voltage across said second battery to provide an error signal; and
    means responsive to said error signal for minimizing the difference between the voltages provided by said first battery and said second battery.

2. A system as recited in claim 1 further including means for temporarily storing said first value; and second switching means having an open position and a closed position and coupled between said first battery charge storage means and said temporary storage means for discharging said first battery charge storage means into said temporary storage means when said second switching means is in said closed position.

3. A system as recited in claim 2 further including means for controlling said first switching means and said second switching means to close and open at alternative times.

4. A system as recited in claim 3 wherein said control means opens and closes said switching means for equal amounts of time.

5. A system as recited in claim 1 wherein said charge storing means includes a capacitor; said first switching means includes a pair of switches coupled between said capacitor and said first battery and further including means for controlling said switches to close simultaneously and to open simultaneously.

6. A system as recited in claim 1 wherein said voltage difference minimizing means includes means responsive to said error signal for charging at least one of said batteries to reduce said error signal towards zero.

7. A system as recited in claim 6 wherein said voltage difference minimizing means includes means for maintaining the voltage across the series combination of said batteries at a first value independent of said error signal and said battery charging means charges said second battery.

8. In a system having first and second batteries connected in series across a first load, a second load being connected across said second battery, a battery equalization system for maintaining a balance between the voltages provided by said first and second batteries comprising:
    means coupled across said first battery for sampling the voltage provided by said first battery;
    means coupled to said sampling means for temporarily storing a signal representing said sampled voltage;
    means for comparing said stored signal to a signal representing the voltage provided by said second battery to provide an error signal; and
    means responsive to said error signal for charging at least one of said batteries to reduce said error signal towards zero.

9. A system as recited in claim 8 wherein said temporary storing means includes or and said sampling means includes means coupled between said first battery and said second battery for switching between open and closed positions.

10. A system as recited in claim 8 wherein said sampling means includes:
    a capacitor coupled across said first battery;
    first means coupled between said capacitor and said battery for switching between open and closed positions; and
    second means coupled between said capacitor and said temporary storing means for switching between open and closed positions, said second switching means being open when said first switching means is closed and being closed when said first switching means is open.

11. A system as recited in claim 10 wherein said first and second switching means are open and closed for equal amounts of time.

12. A system as recited in claim 8 wherein said charging means includes means responsive to said error signal for charging at least one of said batteries to reduce said error signal towards zero.

13. A system as recited in claim 12 wherein said charging means includes means for maintaining the voltage across the series combination of said batteries at a first value independent of said error signal and said battery charging means charges said second battery.

14. A method for balancing the voltages provided by first and second series connected batteries across which are coupled different varying loads, said second battery being referenced to ground and said first battery not being referenced to ground, comprising the steps of:

coupling a capacitor across said first battery to sample the voltage thereacross;

storing a signal representing said sampled voltage;

comparing said stored signal to a signal representing the voltage provided by said second battery to provide a signal representing the difference between the voltages provided by said first and second batteries; and charging said batteries to reduce said difference signal towards zero.

15. A method as recited in claim 14 wherein said charging steps includes the steps of maintaining the voltage across the series combination at a predetermined level and charging said second battery in response to said difference signal.

* * * * *